(12) United States Patent
Coombs et al.

(10) Patent No.: US 8,413,997 B1
(45) Date of Patent: Apr. 9, 2013

(54) SYSTEM FOR CONTROLLING A FLUID SUSPENSION

(75) Inventors: Joshua D. Coombs, East Lansing, MI (US); Aaron Mulder, Okemos, MI (US)

(73) Assignee: Air Lift Company, Lansing, MI (US)

( * ) Notice: Subject to any disclaimer, the term of this patent is extended or adjusted under 35 U.S.C. 154(b) by 4 days.

(21) Appl. No.: 13/301,198

(22) Filed: Nov. 21, 2011

(51) Int. Cl.
*B60G 17/017* (2006.01)
*B60G 17/019* (2006.01)
*B60G 17/0195* (2006.01)

(52) U.S. Cl.
USPC .............. 280/6.152; 280/6.151; 280/6.157; 280/6.158

(58) Field of Classification Search ............ 280/5.5, 280/5.514, 6.151, 6.152, 6.157, 6.158, 6.159
See application file for complete search history.

(56) References Cited

U.S. PATENT DOCUMENTS

| | | | | |
|---|---|---|---|---|
| 3,784,228 A * | 1/1974 | Hoffmann et al. | ......... | 280/6.158 |
| 4,733,876 A | 3/1988 | Heider et al. | | |
| 5,193,849 A * | 3/1993 | Holzmann | ................. | 280/6.152 |
| 5,273,308 A * | 12/1993 | Griffiths | .................... | 280/6.151 |
| 5,452,919 A * | 9/1995 | Hoyle et al. | ................ | 280/5.514 |
| 5,913,525 A | 6/1999 | Schneider et al. | | |
| 6,050,573 A | 4/2000 | Kunz | | |
| 6,098,995 A | 8/2000 | Danis | | |
| 6,161,845 A | 12/2000 | Shono et al. | | |
| 6,234,493 B1 * | 5/2001 | Kleen et al. | ................ | 280/6.152 |
| 6,502,837 B1 | 1/2003 | Hamilton et al. | | |
| 7,051,851 B2 * | 5/2006 | Svartz et al. | .................. | 188/300 |
| 7,380,799 B2 | 6/2008 | Niaura et al. | | |
| 7,398,668 B2 | 7/2008 | Nordmeyer | | |
| 7,429,050 B2 | 9/2008 | Amano | | |
| 7,441,782 B2 | 10/2008 | Stiller | | |
| 7,644,933 B2 | 1/2010 | Brookes et al. | | |
| 7,744,099 B2 * | 6/2010 | Holbrook | .................... | 280/6.153 |
| 2003/0193149 A1 * | 10/2003 | Russell et al. | ............. | 280/6.152 |
| 2005/0093265 A1 * | 5/2005 | Niaura et al. | ............ | 280/124.16 |
| 2007/0120334 A1 | 5/2007 | Holbrook | | |
| 2007/0282498 A1 | 12/2007 | Holbrook et al. | | |
| 2009/0105905 A1 | 4/2009 | Hoffman | | |
| 2010/0073131 A1 * | 3/2010 | Martin et al. | ................ | 340/5.64 |

* cited by examiner

*Primary Examiner* — Ruth Ilan
*Assistant Examiner* — Darlene P Condra
(74) *Attorney, Agent, or Firm* — Warner Norcross & Judd LLP

(57) ABSTRACT

A vehicle fluid suspension control system includes a fluid supply adapted to fluidly communicate with a lift mechanism in the vehicle. A circuit board is connected to the fluid supply and exhausts fluid from the lift mechanism when the kneel switch is activated. The circuit board may also open a flow-path from the fluid supply to the lift mechanism when a kneel switch is deactivated and the brake pedal is depressed. A manifold may be in fluid communication with the fluid supply and the lift mechanism and may include a supply flowpath and an exhaust flowpath. The control system may be programmed with a height averaging adjustment delay, which determines whether the average height of the vehicle during a period of time is outside of a predetermined range. The control system may make corresponding adjustments to bring the height of the vehicle within the predetermined range.

23 Claims, 3 Drawing Sheets

SYSTEM FOR CONTROLLING A FLUID SUSPENSION

BACKGROUND OF THE INVENTION

The present invention relates to vehicle fluid suspension systems, and more particularly to a control system for selectively controlling the components of a fluid suspension system.

Fluid suspension systems are well known for providing a softer, more comfortable ride for a vehicle. Other common applications for fluid suspension systems include: raising or lowering a vehicle; leveling a vehicle that is under a load; leveling recreational vehicles parked on inclined surfaces; and altering the performance characteristics of a vehicle. Fluid suspension systems may be installed on a vehicle by the original equipment manufacturer, or they may be purchased as aftermarket products that are substitutes or supplements for conventional steel spring suspensions.

Common fluid suspension systems may include one or more pneumatic devices, such as air springs, connected between the vehicle axles and the vehicle chassis. Pressurized air from an air supply can be forced into or exhausted from one or more of the air springs to provide the vehicle with desired suspension characteristics.

Some air suspension systems are connected to control systems that automatically force air into the air springs or exhaust air from the air springs upon certain conditions. For example, many vehicles are equipped with a ride height control system that utilizes height sensors or pressure sensors in combination with a controller to monitor the relative height of the vehicle in one or more locations, and automatically supply or exhaust fluid from one or more air spring as a function of the sensor output. In a similar manner, it is common for recreational vehicles to include automatic leveling systems that utilize similar height or pressure sensors to level a vehicle, for instance, when the vehicle has been parked in a desired parking space.

In public buses and emergency vehicles, it is common for control systems to operate fluid suspension systems that lower portions of the vehicle for selected periods of time—often referred to as "kneeling"—in order to make the vehicle more accessible to users. Buses often kneel by lowering an air spring nearest to the door of the bus when the bus is stopped to allow passengers to enter and exit, such that the landing is closer to the street for easier ingress and egress by the passengers.

In emergency vehicles, the kneel function is commonly located at the rear of the vehicle, such that the rear can be raised and lowered to enable wheeled stretchers to be moved into and out of the rear doors of the emergency vehicle. One known control system for operating the kneel function in an emergency vehicle includes a kneel switch triggered by the opening or closing of the rear door. In one known configuration, the control system exhausts the air springs each time the rear door is opened to lower the rear of the vehicle to an appropriate height to access the vehicle. Each time the rear doors are closed, the kneel switch triggers the control system to fill the air springs such that they raise the vehicle to an appropriate ride height.

Unfortunately, this type of emergency vehicle control system often leads to unnecessary raising and lowering of the vehicle. For example, typical operation of emergency vehicles includes: (1) parking the vehicle, (2) opening the rear doors to unload the stretcher, (3) closing the rear doors, (4) opening the rear doors again to load the stretcher, and (5) closing the rear doors again before driving away. In some cases, the doors are opened and closed additional times in order to remove additional equipment. Each opening and closing of the rear doors causes the control system to raise or lower the rear air springs, regardless of whether or not the stretcher is being loaded or unloaded.

SUMMARY OF THE INVENTION

The present invention provides a vehicle fluid suspension control system that operates the kneel function of a vehicle, such as an emergency vehicle, while conserving the power and fluid used by the vehicle fluid suspension system.

In one embodiment, the control system includes a fluid supply that fluidly communicates with a lift mechanism in the vehicle that is capable of being actuated to cause a portion of the vehicle to kneel. A circuit board is operatively connected to the fluid supply. The circuit board may be programmed to exhaust fluid from the lift mechanism—causing the vehicle to kneel—when the circuit board receives a kneel signal from the kneel switch. The circuit board may further be programmed to supply fluid to the lift mechanism (i.e., to raise the vehicle from the kneel position) when the circuit board receives both: (1) a non-kneel signal from a kneel switch in the vehicle and (2) a brake signal from the brake light system in the vehicle. The control system may include a manifold in fluid communication with the fluid supply and the lift mechanism that opens a supply flowpath or an exhaust flowpath in response to signals from the circuit board.

In another embodiment, the kneel switch may be a mechanical switch that sends a signal to the circuit board upon the opening and closing of one or more of the rear doors of the vehicle. The brake signal may be supplied by an electrical connection between the circuit board and the original equipment manufacturer brake system of the vehicle. This connection may be made at any location within the vehicle brake system, enabling the current system to be easily applied to a vehicle as an aftermarket product.

In another embodiment, the control system operates a vehicle ride height system to automatically maintain a desired vehicle height, or a relative height between multiple locations of the vehicle—as the vehicle moves. The ride height system includes at least one height sensor adapted to sense the height of the vehicle at a particular location on the vehicle. The control system is programmed with a height averaging adjustment delay, which calculates an average height of the vehicle during a period of time. If the average height of the vehicle is less than a predetermined lower height limit after the period of time has passed, the circuit board signals the manifold to supply fluid to the lift mechanism. If the average height of the vehicle is greater than a predetermined upper height limit after the period of time has passed, the circuit board signals the manifold to exhaust fluid from the lift mechanism.

In another embodiment, a method for controlling the height of a vehicle is provided, including determining whether the kneel switch is activated, exhausting air from the lift mechanism if the kneel switch is activated, determining whether the kneel switch is deactivated and whether the brake pedal is depressed, and supplying air to the lift mechanism if the kneel switch is deactivated and the brake pedal is depressed.

DETAILED DESCRIPTION OF THE CURRENT EMBODIMENTS

I. Overview

Figure 1:
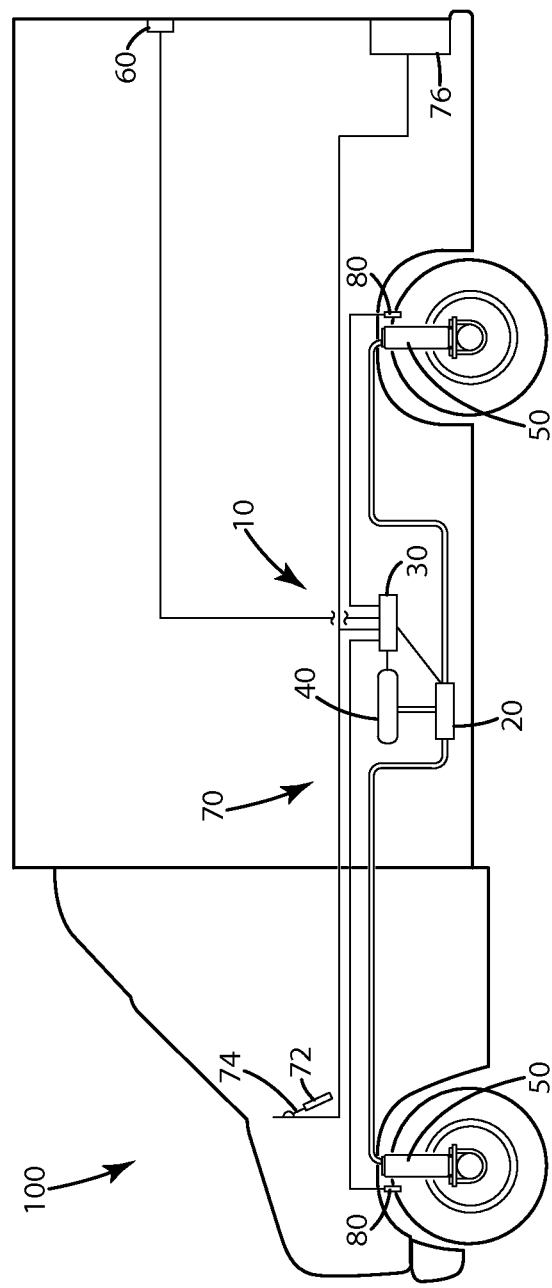
FIG. 1 is a schematic of a vehicle fluid suspension control system according to one embodiment of the present invention.
Figure 2:
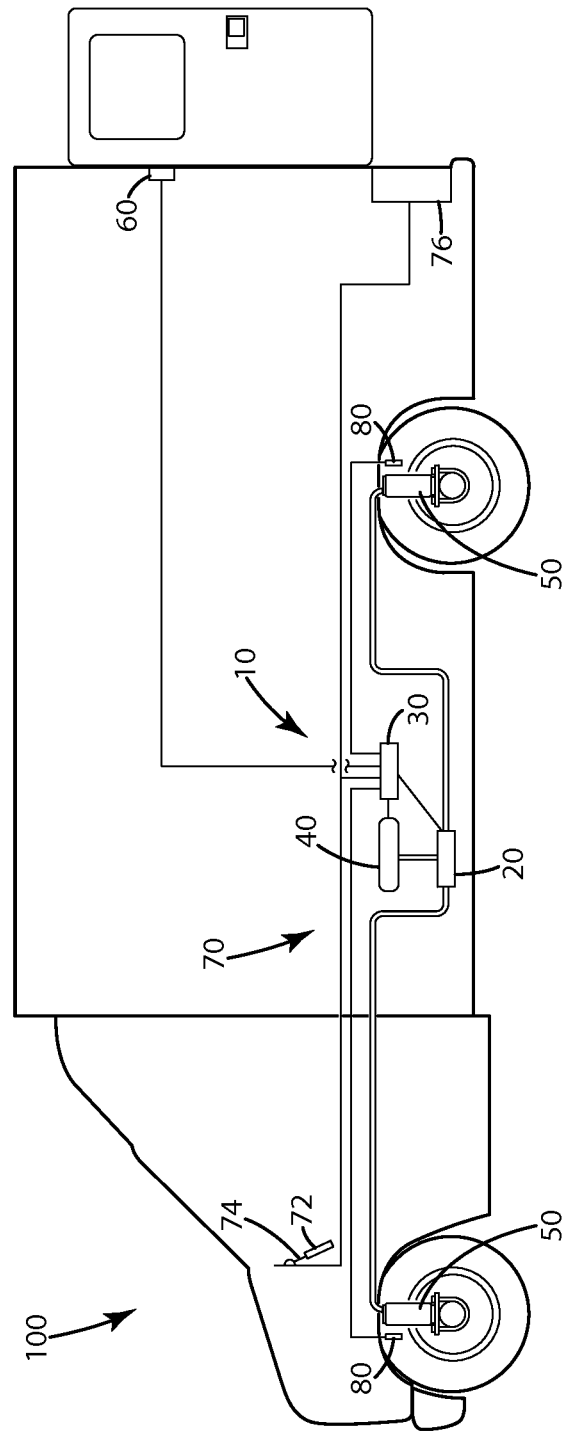
FIG. 2 is a schematic of the vehicle fluid suspension control system of FIG. 1.

A vehicle fluid suspension control system according to one embodiment of the present invention is shown in FIGS. 1-2 and generally designated 10. The control system 10 is operable to monitor and operate certain parts of the vehicle and the height of the vehicle. The control system automatically adjusts the height of the vehicle in response to movements of the certain parts of the vehicle and in response to the height of the vehicle by supplying fluid to, or exhausting fluid from, a lift mechanism. In the embodiment described below, the system is particularly adapted for use in operating the kneel function of an emergency vehicle by operating a lift mechanism to automatically raise and lower the rear of the emergency vehicle. The illustrated embodiment, may, however, be used to raise and lower a variety of vehicles.

II. Structure

The control system 10 generally includes a manifold 20, a controller or circuit board 30 and a fluid supply 40. The control system may include a lift mechanism 50 and a kneel switch 60, or the control system 10 may interact with these components after they are installed in a vehicle 100. Although the control system 10 may be generally described in connection with a pneumatic system, other variations including hydraulic systems are contemplated.

The lift mechanism 50 may be any mechanism for raising or lowering the height of a vehicle. In one embodiment, the lift mechanism includes one or more air springs mounted between the rear axle and chassis of the vehicle such that they are capable of raising and lowering the rear of the vehicle adjacent to the rear door(s) of the vehicle. The lift mechanism 50 may support the vehicle in two different general positions. In one embodiment, the lift mechanism 50 is one or more pneumatic springs that may be filled and exhausted to move the vehicle between the two different general positions. The first general position, shown in FIG. 1, is referred to as "non-kneeling," which means the lift mechanism 50 raises or maintains the vehicle at an elevated height intended for use while the vehicle is in transit. The elevated height is intended to ensure that the lift mechanism 50 will provide smooth support for the vehicle during normal road surface variation. The elevated height is also intended to ensure that the vehicle maintains a sufficient clearance to prevent contact with the road surface or objects positioned on the road surface. The second general position, shown in FIG. 2, is referred to as "kneeling," which means the lift mechanism 50 lowers or maintains the vehicle at a lowered height intended for use while the vehicle is stopped and occupants are interacting with the vehicle. For example, kneeling may be used to lower an ambulance so a patient may be loaded or unloaded. Kneeling may also be used to lower a bus to allow riders to enter or exit the bus. As further described below, the lift mechanism 50 may also make minor adjustments to the height of the vehicle when in the non-kneeling position.

As shown in FIGS. 1 and 2, the lift mechanism 50 is in fluid communication with the manifold 20 and the manifold 20 is in fluid communication with the fluid supply or compressor 40 through conventional connections such as pneumatic or hydraulic hoses. In one embodiment, the manifold 20 is a block that may be formed from a variety of materials, including aluminum or another metal, or from injection molded plastic. The manifold 20 defines multiple ports extending at least a portion of the way through the manifold 20. The ports generally form a supply flowpath, an exhaust flowpath, and a maintain flowpath. The manifold 20 can include solenoids that operate valves within the flowpaths to manipulate the air flow within these flowpaths. When the supply flowpath is opened, the compressor 40 and the lift mechanism 50 are in fluid communication. In the supply orientation, the compressor 40 may be activated to supply fluid to the lift mechanism 50 and effectively raise the lift mechanism 50 and vehicle 100. For example, if pneumatic springs are used, the compressor 40 may supply air to the pneumatic springs, which may raise the vehicle 100 from the kneel to the non-kneel position, or may cause smaller increases in the height of the vehicle 100 as further described below. It should be noted that "activating" the compressor 40 is only intended to mean that the compressor 40 is actively supplying air, regardless of the compressor motor running. For example, the compressor may include a tank that is maintained at a predetermined pressure by the compressor motor automatically being turned on when insufficient pressure is detected. In this example, "activating" the compressor 40 may mean simply moving air out of the tank by opening the supply flowpath.

When the exhaust flowpath is opened, fluid is exhausted from the lift mechanism 50, which lowers the lift mechanism 50 and the vehicle 100. For example, if pneumatic springs are used, the exhaust flowpath may place the lift mechanism 50 in fluid communication with the atmosphere. In this orientation, air is exhausted from the pneumatic springs and the height of the vehicle 100 is lowered, which may lower the vehicle from the non-kneel to the kneel position, or may cause smaller decreases in the height of the vehicle 100 as further described below.

When the maintain flowpath is opened, the fluid level in the lift mechanism 50 is maintained and fluid is neither supplied to nor exhausted from the lift mechanism 50. In this orientation, the manifold 20 may essentially block the hose connecting the manifold 20 and the lift mechanism 50, preventing fluid from entering or exiting lift mechanism 50. Alternatively, this orientation may be the same as the supply orientation, except that the compressor may be deactivated such that it no longer supplies air into the lift mechanism, and instead maintains pressure within the connected air spring. The manifold 20 may have a supply flowpath, an exhaust flowpath and a maintain flowpath for each element of lift mechanism 50. For example, if pneumatic springs are used, the manifold may have a supply, exhaust and maintain flowpath for adjusting the height of each pneumatic spring. The details of the manifold 20 may be similar to the manifold disclosed in U.S. application Ser. No. 12/912,212 entitled "Integrated Manifold System For Controlling an Air Suspension," filed on Oct. 26, 2010 and herein incorporated by reference in its entirety.

In one embodiment, the circuit board 30 is operatively connected to the manifold 20 and the compressor 40 via wired or wireless communication. The circuit board 30 is programmed to transmit signals to the manifold 20 to change between the supply, exhaust and maintain flowpaths. The circuit board 30 may also transmit signals to the compressor 40 to activate and deactivate the compressor (i.e., to turn the compressor on and off or to open and close the valve of a tank). In this manner, the circuit board 30 may cause the vehicle to change between the kneel and non-kneel positions. The circuit board 30 may be any type of circuit board suitable for the application, including a printed circuit board.

The circuit board 30 is operatively connected to the kneel switch 60 via wired or wireless communication. The circuit board 30 may be programmed to place the vehicle in the kneel position in response to a kneel condition, in which the kneel switch 60 is activated. When the kneel switch 60 is activated, the kneel switch 60 transmits a kneel signal to the circuit board 30, which triggers the circuit board 30 to place the vehicle in the kneel position. The kneel switch may be mounted in any of a variety of locations in the vehicle. For example, the kneel switch 60 may be mounted so that when a rear door is opened, the kneel switch 60 is automatically activated. In one embodiment, the kneel switch is a mechanical switch that is mounted on or near one or more of the rear doors of the vehicle, such that the opening and closing of the rear door moves the kneel switch between an activated and a deactivated position. This may be useful in the context of ambulances, in which occupants access the vehicle and insert/remove patients through the rear doors. The kneel switch 60 may also be mounted so that a user may manually activate and deactivate the kneel switch 60.

The circuit board 30 is operatively connected to the brake light system 70 in the vehicle 100 via wired or wireless communication. The brake light system 70 may generally include a brake pedal 72, a brake switch 74 operatively connected to the brake pedal 72, and one or more brake lights 76 operatively connected to the brake switch 74. A driver may activate the brake light system 70 by depressing the brake pedal 72. The brake pedal 72 activates the brake switch 74, which transmits an electrical signal to the brake lights 76, which ultimately activates the brake lights 76 and causes them to illuminate. The circuit board 30 may be programmed to detect when the brake pedal 72 is depressed by sensing the level of voltage supplied to the brake lights 76. For example, if there is a wired connection between the brake switch 74 and the brake lights 76, the circuit board 30 may be electrically connected to the wired connection, as shown in FIGS. 1-2. In this configuration, the circuit board 30 may be programmed to determine the amount of voltage in the wired connection and determine from the amount of voltage whether the brake light system is activated. In this configuration, the digital input on the circuit board 30 corresponding to the brake light system 70 may be a high impedance digital input. A high impedance digital input has a lower floating voltage, which makes the digital input more usable with Light Emitting Diode (LED) brake lights. If the floating voltage associated with the input is too high, the LED brake lights may appear to be slightly illuminated. It is also contemplated that the circuit board 30 may determine the current supplied to the brake lights 76 to determine whether the brake light system is activated. Optionally, the current or voltage supplied to the brake lights 76 may be determined via wireless sensors and wireless communication.

The circuit board 30 may be programmed to place the vehicle 100 in a non-kneel position in response to a non-kneel condition, in which both the kneel switch 60 is deactivated and the brake pedal 72 is depressed. Requiring the brake pedal 72 to be depressed to change between the kneel and non-kneel positions may provide a greater probability that the vehicle is about to move, which would be an appropriate time to bring the vehicle 100 to the non-kneel position. Requiring both deactivation of the kneel switch 60 and depression of the brake pedal 72 may also decrease the number of unnecessary changes between the kneel and non-kneel positions. Otherwise, if only the kneel switch 60 were required to place the vehicle 100 in a non-kneel position, the vehicle may raise to the non-kneel position, even when the vehicle is not about to move. For example, in the ambulance context, if the kneel switch 60 is connected to the door, the ambulance may raise and lower every time the door is opened and closed, which may create unnecessary raising and lowering of the ambulance as various equipment is removed and returned while the ambulance remains parked. However, if the circuit board 30 requires both the kneel switch 60 to be deactivated and the brake pedal 72 to be depressed before changing to the non-kneel position, there may be a greater probability that the driver is about to move the ambulance before the vehicle 100 is placed in the non-kneel position.

The control system 10 may make minor adjustments to the vehicle height after the vehicle is placed in the non-kneel position. For example, the control system 10 may raise the height of the vehicle 100 (as described above) if the vehicle height is less than a predetermined height or lower the height of the vehicle (as described above) if the vehicle height is greater than a predetermined height. The control system 10 may include one or more height sensors 80 operatively connected to the circuit board 30 via wired or wireless communication that monitor the height of the vehicle 100 at one or more locations. For example, if four pneumatic springs are used, a corresponding height sensor 80 may be positioned proximate to each spring. The height sensors 80 may be conventional sensors known to those skilled in the art.

The circuit board 30 may be programmed with an upper height limit and a lower height limit corresponding to each height sensor 80 to determine whether the height of the vehicle 100 is within an acceptable range. The circuit board 80 may also be programmed with a height averaging adjustment delay. The height averaging adjustment delay may determine an average height of the vehicle 100 for each height sensor 80 over a predetermined period of time by taking multiple readings during the period of time and averaging them together. The circuit board 30 may then make adjustments to bring the vehicle within a desired height range after the period of time has passed. For example, if the period of time is 45 seconds, then the circuit board 30 may only make height adjustments once every 45 seconds. This limits unnecessary height adjustments, which may occur if the system were to instantaneously adjust the height of the vehicle 100. The height averaging adjustment delay may also be programmed to filter out or discard height sensor readings that are either greater than a maximum height limit or less than a minimum height limit. For example, a digital low pass filter may be included. This feature may prevent the average height from being skewed by an unusually high or low sensor reading, which may occur if the vehicle contacts a large bump, for example.

III. Operation

In use, a user driving a vehicle 100 with control system 10 may stop the vehicle and activate the kneel switch 60. The kneel switch 60 may be manually activated by the user, or may be automatically activated. For example, the kneel switch 60 may be automatically activated when the user opens the rear door.

The circuit board 30 receives a signal that the kneel switch 60 has been activated and signals the solenoids in the manifold 20 to open the exhaust flowpath. Once the exhaust flowpath is opened, fluid may exit the lift mechanism 50, which reduces the height of the vehicle 100. For example, if pneumatic springs are used, the exhaust flowpath may vent air from the pneumatic springs to the atmosphere. The manifold 20 may exhaust some or all of the fluid from the lift mechanism 50 to lower the vehicle to the kneel position shown in FIG. 2. The manifold may open the maintain flowpath once a desired amount of fluid is exhausted from the lift mechanism 50. The vehicle 100 is now in the kneel position and users can easily access, enter or exit the vehicle 100.

Once the user is ready to move the vehicle 100, the user may deactivate the kneel switch 60. As with activation, the kneel switch 60 may be manually deactivated by the user, or may be automatically deactivated. For example, the kneel switch 60 may be automatically deactivated when the user closes the rear door. The circuit board 30 receives a signal that the kneel switch 60 is deactivated.

After the kneel switch 60 is deactivated, the user may enter the vehicle 100 and depress the brake pedal 72 to prepare to move the vehicle 100. When the circuit board 30 receives a signal that the brake pedal 72 is depressed, the circuit board 30 signals the solenoids in the manifold 20 to open the supply flowpath. When the supply flowpath is opened, the lift mechanism 50 and the compressor 40 are placed in fluid communication and fluid is supplied to the lift mechanism 50, which raises the height of vehicle 100 to the non-kneel position shown in FIG. 1. It is contemplated that, to open the supply flowpath, circuit board 30 may either receive simultaneous signals indicating that the kneel switch 60 is deactivated and the brake pedal 72 is depressed, or may receive these signals consecutively.

Figure 3:
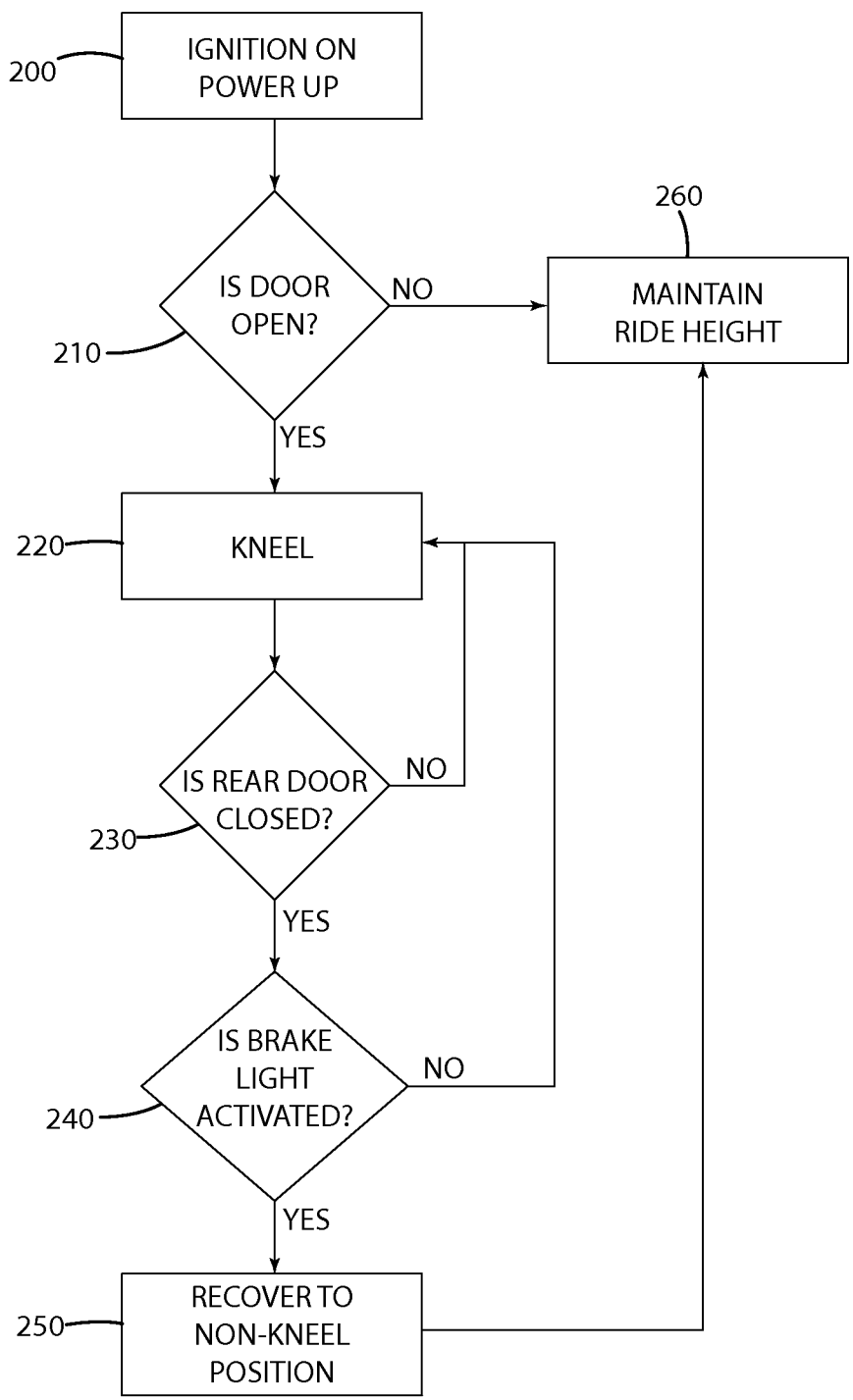
FIG. 3 is a flow chart of the vehicle fluid suspension control system of FIG. 1.

An exemplary flow chart illustrating the operation of a control system 10 with a kneel switch 60 connected to a rear door of a vehicle is shown in FIG. 3. The system first powers up when the ignition is turned on 200. The control system 10 then determines whether the rear door is open 210. If the rear door is not open, the control system 10 maintains the ride height of the vehicle in the non-kneel position 260. If the rear door is open, the control system 10 places the vehicle in the kneel position 220, as described above. The control system 10 then determines whether the rear door is closed 230. If the rear door is not closed, then the control system 10 maintains the vehicle in the kneel position 220. If the rear door is closed, then the control system 10 determines whether the brake light is activated 240. If the brake light is not activated, the control system 10 maintains the vehicle in the kneel position 220. If the brake light is activated, the control system 10 recovers to the non-kneel position 250. The control system 10 then maintains the ride height of the vehicle in the non-kneel position 260 until the rear door is opened.

As the vehicle 100 is in transit, various characteristics including vehicle speed and load characteristics may cause the height of the vehicle 100 to change. The height averaging adjustment delay may take readings from one or more height sensors 80 during a predetermined time period and average the readings for each sensor 80 together to determine an average height of the vehicle 100 at each sensor 80 for the preceding time period. If any height readings taken during the preceding time period were either greater than a maximum height limit or less than a minimum height limit, the height averaging adjustment delay may discard those readings and may not use them in calculating the average height of the vehicle. If the average heights are within the predetermined upper and lower limits, then the vehicle 100 is within a desired height range and no adjustment is made to the height of the vehicle 100. If any of the average heights are outside of the predetermined upper and lower limits, then the circuit board 30 signals the manifold 20 to either open the exhaust flowpath (if the height is greater than the upper limit) or open the supply flowpath (if the height is less than the lower limit). As noted above, each element of lift mechanism 50 may have an exhaust flowpath, a supply flowpath and a maintain flowpath. The circuit board 30 may open different flowpaths for different elements of lift mechanism 50. For example, if multiple pneumatic springs are used, the circuit board 30 may open the exhaust flowpath for one spring while opening the supply flowpath for a second spring.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property of privilege is claimed are defined as follows:

1. A vehicle fluid suspension control system comprising:
   a fluid supply adapted to fluidly communicate with a lift mechanism in the vehicle;
   a controller operatively connected to the fluid supply;
   the controller programmed to supply fluid to the lift mechanism when the controller receives a non-kneel signal from a kneel switch in the vehicle and an activation signal from a brake light system in the vehicle.

2. The control system of claim 1 wherein the controller is adapted to detect an amount of voltage in the brake light system,
   wherein the activation signal is an increase in the amount of voltage in the brake light system.

3. The control system of claim 1 including a manifold in fluid communication with the fluid supply, the manifold adapted to fluidly communicate with the lift mechanism.

4. The control system of claim 3 wherein the manifold is operatively connected to the controller, the controller programmed to signal the manifold to exhaust fluid from the lift mechanism in response to receiving a kneel signal from the kneel switch in the vehicle.

5. The control system of claim 4 including at least one height sensor operatively connected to the controller, the height sensor adapted to sense a height of the vehicle.

6. The control system of claim 5 wherein the controller is programmed with a height averaging adjustment delay, the height averaging adjustment delay programmed to calculate an average height of the vehicle during a period of time.

7. The control system of claim 6 wherein the controller is programmed with a lower height limit and an upper height limit,
   wherein the controller is programmed to signal the manifold to exhaust fluid from the lift mechanism when the average height of the vehicle is greater than the upper height limit for the period of time,
   wherein the controller is programmed to signal the manifold to supply fluid to the lift mechanism when the height of the vehicle is less than the lower height limit for the period of time.

8. The control system of claim 7 wherein the controller is programmed with a maximum height limit and a minimum height limit, the height averaging adjustment delay programmed to discard a sensed vehicle height that is at least one of greater than the maximum height limit and less than the minimum height limit.

9. The control system of claim 1 wherein the kneel switch is mounted to a door in the vehicle, the kneel switch programmed to transmit a kneel signal when the door is opened, the kneel switch programmed to transmit the non-kneel signal when the door is closed.

10. An air suspension control system for a vehicle comprising:

a manifold adapted to be connected to a lift mechanism, the manifold having a supply flowpath and an exhaust flowpath;

a circuit board connected to the manifold for controlling the manifold to selectively open the supply flowpath and the exhaust flowpath, the circuit board being operatively connectable to a brake light system of the vehicle;

a kneel switch connected to the circuit board, the kneel switch being one of activated and deactivated; and wherein the circuit board is programmed to open the supply flowpath in response to a non-kneel condition in which the kneel switch is deactivated and the brake light system is activated.

11. The control system of claim 10 wherein the circuit board is adapted to detect an amount of voltage in the brake light system to determine whether the brake light system is activated.

12. The control system of claim 10 including a kneel condition in which the kneel switch is activated, the circuit board adapted to open the exhaust flowpath in response to the kneel condition.

13. The control system of claim 12 wherein the circuit board is operatively connectable to an air supply, the manifold adapted to be connected to the air supply, wherein the circuit board is adapted to activate the air supply in response to the non-kneel condition.

14. The control system of claim 13 wherein the lift mechanism includes at least one pneumatic spring, wherein the manifold is adapted to exhaust air from the at least one pneumatic spring in response to the kneel condition, wherein the manifold is adapted to supply air to the at least one pneumatic spring in response to the non-kneel condition.

15. The control system of claim 14 including at least one height sensor operatively connected to the circuit board, the at least one height sensor adapted to sense a height of the vehicle.

16. The control system of claim 15 wherein the circuit board is programmed with a height averaging adjustment delay, the height averaging adjustment delay programmed to calculate an average height of the vehicle during a predetermined period of time.

17. The control system of claim 16 wherein the circuit board is programmed with an upper height limit and a lower height limit, wherein the circuit board is programmed to open the supply flowpath and activate the air supply when the average height of the vehicle during the predetermined period of time is less than the lower height limit, wherein the circuit board is programmed to open the exhaust flowpath when the average height of the vehicle during the predetermined period of time is greater than the upper height limit.

18. The control system of claim 17 wherein the controller is programmed with a maximum limit and a minimum limit, wherein the height averaging adjustment delay is programmed to discard a sensed height that is at least one of greater than the maximum limit and less than the minimum limit.

19. The control system of claim 10 wherein the kneel switch is mounted to a door in the vehicle, the kneel switch activated when the door is opened, the kneel switch deactivated when the door is closed.

20. A method for controlling the height of a vehicle comprising:

determining whether a kneel switch in the vehicle is activated;

exhausting air from a lift mechanism in the vehicle if the kneel switch is activated;

determining whether the kneel switch is deactivated and whether a brake pedal in the vehicle is depressed;

supplying air to the lift mechanism upon both: (a) deactivation of the kneel switch and (b) depression of the brake pedal.

21. The method of claim 20 including determining an average height of the vehicle during a period of time;

determining whether the average height of the vehicle during the period of time is at least one of greater than an upper limit and less than a lower limit;

supplying air to the lift mechanism if the average height of the vehicle during the period of time is less than the lower limit; and exhausting air from the lift mechanism if the average height of the vehicle during the period of time is greater than an upper limit.

22. The method of claim 21 wherein the determining an average height of the vehicle step includes determining a height of the vehicle at multiple times during the period of time; and discarding any of the heights that are at least one of greater than a maximum height limit and less than a lower height limit.

23. The method of claim 20 wherein the kneel switch is mounted to a door in the vehicle so that the kneel switch is activated when the door of the vehicle is opened and deactivated when the door of the vehicle is closed.

* * * * *